(12) United States Patent
Nakajima et al.

(10) Patent No.: US 10,730,124 B2
(45) Date of Patent: Aug. 4, 2020

(54) TAPER THREAD-CUTTING SPIRAL PIPE TAP

(71) Applicant: OSG CORPORATION, Toyokawa-shi, Aichi (JP)

(72) Inventors: Takayuki Nakajima, Toyokawa (JP); Kohichi Saitoh, Toyokawa (JP)

(73) Assignee: OSG CORPORATION, Toyokawa-shi (JP)

( * ) Notice: Subject to any disclaimer, the term of this patent is extended or adjusted under 35 U.S.C. 154(b) by 0 days.

(21) Appl. No.: 16/075,712

(22) PCT Filed: Mar. 8, 2016

(86) PCT No.: PCT/JP2016/057245
§ 371 (c)(1),
(2) Date: Aug. 6, 2018

(87) PCT Pub. No.: WO2017/154121
PCT Pub. Date: Sep. 14, 2017

(65) Prior Publication Data
US 2019/0201993 A1    Jul. 4, 2019

(51) Int. Cl.
*B23G 5/06* (2006.01)
*B23G 1/52* (2006.01)

(52) U.S. Cl.
CPC ............... *B23G 5/06* (2013.01); *B23G 1/52* (2013.01); *B23G 2200/48* (2013.01); *Y10T 408/9046* (2015.01)

(58) Field of Classification Search
CPC ........ B23G 5/06; B23G 1/52; B23G 2200/28; B23G 2200/34; B23G 2200/48; Y10T 408/904; Y10T 408/9046; Y10T 408/9048
See application file for complete search history.

(56) References Cited

U.S. PATENT DOCUMENTS 1,256,138 A *  2/1918  Kehl ..................... B23G 5/06
                                                  408/219
1,293,432 A     2/1919  Higgins
                 (Continued)

FOREIGN PATENT DOCUMENTS

CN    2172690 Y    7/1994
CN    1511071 A    7/2004
                (Continued)

OTHER PUBLICATIONS

Apr. 26, 2016 International Search Report issued in International Patent Application No. PCT/JP2016/057245.
(Continued)

*Primary Examiner* — Eric A. Gates
*Assistant Examiner* — Chwen-Wei Su
(74) *Attorney, Agent, or Firm* — Oliff PLC

(57) ABSTRACT

A pipe-tapered-thread machining tap has a thread, four spiral flutes and four cutting edges that include a plurality of thread intersection portions at each of which a corresponding one of the four cutting edges intersects with the thread. The thread intersection portions of the cutting edges have four groups, such that each of the four groups has ones of the thread intersection portions that are portions of a corresponding one of the four cutting edges. Every two of the thread intersection portions of each of the four groups is removed, such that, in each of the four groups, at least one of the thread intersection portions that is removed and at least another one of the thread intersection portions that is not removed are alternately arranged in a direction in which a corresponding one of the four cutting edges extends.

7 Claims, 7 Drawing Sheets

(56) References Cited

U.S. PATENT DOCUMENTS

| | | | | |
|---|---|---|---|---|
| 3,246,351 A | * | 4/1966 | Lorence | B23G 5/06 |
| | | | | 408/217 |
| 3,945,069 A | * | 3/1976 | Cecil | B23G 5/06 |
| | | | | 470/198 |
| 4,023,914 A | | 5/1977 | Holmes | |
| 5,664,915 A | * | 9/1997 | Hawke | B23G 5/06 |
| | | | | 408/220 |
| 6,499,920 B2 | * | 12/2002 | Sawabe | B23G 5/005 |
| | | | | 408/222 |
| 6,565,297 B2 | * | 5/2003 | Schmitt | B23G 5/182 |
| | | | | 409/131 |
| 2004/0258492 A1 | | 12/2004 | Hakansson | |
| 2008/0075550 A1 | | 3/2008 | Reed | |

FOREIGN PATENT DOCUMENTS

| | | | | |
|---|---|---|---|---|
| EP | 0867252 A2 | * | 9/1998 | ............ B23G 5/06 |
| GB | 109443 A | | 4/1918 | |
| JP | S52-088899 A | | 7/1977 | |
| JP | S64-026128 U | | 2/1989 | |
| JP | H03-100021 U | | 10/1991 | |
| JP | 3005741 U | | 1/1995 | |
| JP | H07-060546 A | | 3/1995 | |
| JP | 3162994 U | | 9/2010 | |

OTHER PUBLICATIONS

Oct. 8, 2019 Office Action issued in Chinese Patent Application No. 201680083233.X.
Jan. 30, 2020 extended Search Report issued in European Patent Application No. 16893453.7.

* cited by examiner

FIG.3

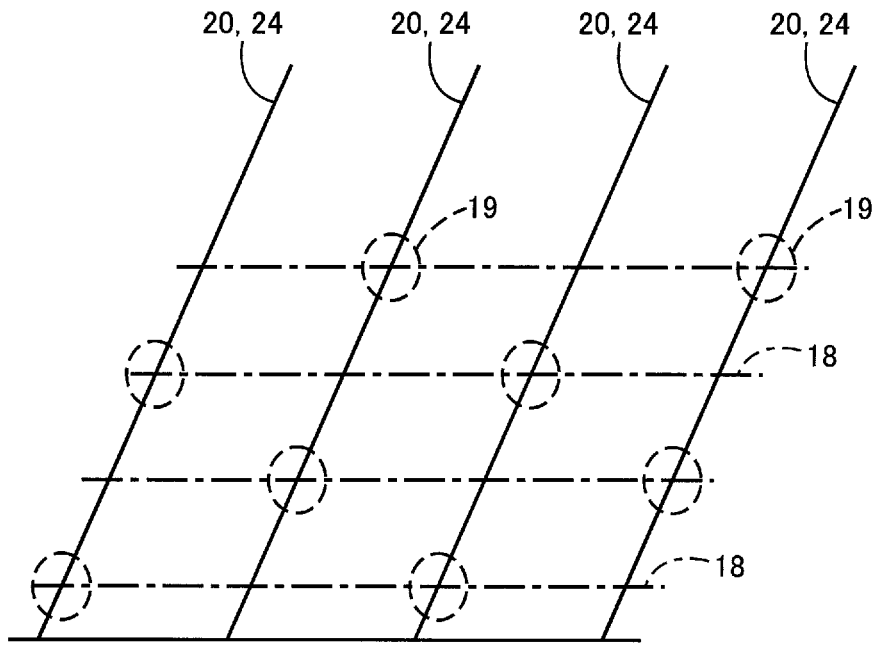

FIG.4

| SHANK-SIDE | | FLUTE ① | FLUTE ② | FLUTE ③ | FLUTE ④ |
|---|---|---|---|---|---|
| | 10 | NOT REMOVED | REMOVED | NOT REMOVED | REMOVED |
| | 9 | REMOVED | NOT REMOVED | REMOVED | NOT REMOVED |
| | 8 | NOT REMOVED | REMOVED | NOT REMOVED | REMOVED |
| 14 | 7 | REMOVED | NOT REMOVED | REMOVED | NOT REMOVED |
| | 6 | NOT REMOVED | REMOVED | NOT REMOVED | REMOVED |
| | 5 | REMOVED | NOT REMOVED | REMOVED | NOT REMOVED |
| | 4 | NOT REMOVED | REMOVED | NOT REMOVED | REMOVED |
| | 3 | REMOVED | NOT REMOVED | REMOVED | NOT REMOVED |
| 12 | 2 | NOT REMOVED | NOT REMOVED | NOT REMOVED | NOT REMOVED (FIRST COMPLETE THREAD RIDGE) |
| | 1 | NOT REMOVED | NOT REMOVED | NOT REMOVED | NOT REMOVED |

THREAD PORTION END

FIG.7

| | THREAD SIZE | | NUMBER OF FLUTES | THREAD HEIGHT | CUTTING AMOUNT | | INTER-RUPTING |
|---|---|---|---|---|---|---|---|
| | NUMBER OF THREAD RIDGES | PITCH | | | CHAMFERED PORTION | COMPLETE THREAD PORTION | |
| EMBODIMENT 1 | Rc1/2 | 14 | 1.81 | 4 | 1.16 | 0.116 | 0.011 | YES |
| COMPARATIVE 1 | Rc1/2 | 14 | 1.81 | 3 | 1.16 | 0.155 | 0.015 | YES |
| COMPARATIVE 2 | Rc1/2 | 14 | 1.81 | 4 | 1.16 | 0.116 | 0.005 | NO |
| COMPARATIVE 3 | Rc1/2 | 14 | 1.81 | 5 | 1.16 | 0.093 | 0.009 | YES |

FIG.8

| | NUMBER OF FLUTES | FLUTE HELIX ANGLE | INTERRUPTING | OUTLINE OF RESULTS |
|---|---|---|---|---|
| EMBODIMENT 1 | 4 FLUTES | 40° | YES | OK |
| COMPARATIVE 1 | 3 FLUTES | 40° | YES | STOP MARK WAS LARGE |
| COMPARATIVE 2 | 4 FLUTES | 40° | NO | CUTTING CHIP HAD BELLOWS-LIKE SHAPE (NORMAL CUTTING WAS NOT PERFORMED) |
| COMPARATIVE 3 | 5 FLUTES | 40° | YES | CUTTING CHIP CLOGGING WAS OCCURRED |

FIG.10

| SHANK-SIDE | FLUTE ① | FLUTE ② | FLUTE ③ | FLUTE ④ |
|---|---|---|---|---|
| 10 | NOT REMOVED | REMOVED | REMOVED | NOT REMOVED |
| 9 | REMOVED | NOT REMOVED | NOT REMOVED | REMOVED |
| 8 | NOT REMOVED | REMOVED | REMOVED | NOT REMOVED |
| 7 | REMOVED | NOT REMOVED | NOT REMOVED | REMOVED |
| 6 | NOT REMOVED | REMOVED | REMOVED | NOT REMOVED |
| 5 | REMOVED | NOT REMOVED | NOT REMOVED | REMOVED |
| 4 | NOT REMOVED | REMOVED | REMOVED | NOT REMOVED |
| 3 | REMOVED | NOT REMOVED | NOT REMOVED | REMOVED |
| 2 | NOT REMOVED | NOT REMOVED | NOT REMOVED | NOT REMOVED (FIRST COMPLETE THREAD RIDGE) |
| 1 | NOT REMOVED | NOT REMOVED | NOT REMOVED | NOT REMOVED |

Rows 3–10 bracketed as 14; rows 1–2 bracketed as 12.

THREAD PORTION END

FIG.11

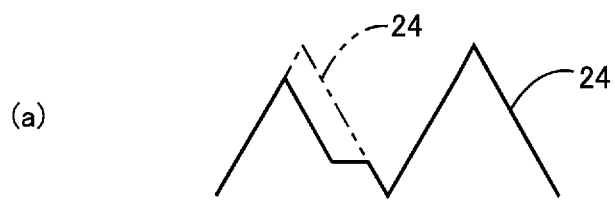

(a)

(b)

TAPER THREAD-CUTTING SPIRAL PIPE TAP

TECHNICAL FIELD

The present invention relates to a spiral tap for machining an internal thread as a pipe tapered thread, and more particularly is concerned with a technique for restraining occurrence of drawback called "tearing" in the machined internal thread and occurrence of breakage of the tool

BACKGROUND ART

There is known a pipe-tapered-thread machining tap for machining a pipe tapered internal thread in a pipe, a pipe adaptor, a fluid equipment or the like. In the pipe-tapered-thread machining tap, its complete thread portion as well as its chamfered portion is tapered for making the pipe tapered internal thread tapered, so that thread cutting is performed not only by the chamfered portion but also by the complete thread portion.

In the pipe-tapered-thread machining tap, the thread cutting performed by the complete thread portion is carried out not only by its crest but also by its root whereby larger cutting resistance is generated as compared with thread cutting performed by a chamfered portion in a pipe-straight-thread machining tap. Thus, in the pipe-tapered-thread machining tap, tap breakage, chipping, wear and other problems could easily occur, resulting in problems such as insufficiencies of machining efficiency and tool durability.

On the other hand, there is proposed a pipe-tapered-thread machining tap in which a total of edge thickness angles is 125°-150° for preventing breakage and chipping of the tap and also preventing cutting chip clogging so as to provide a high efficiency and a long tool life even where the tap is used for machining a high-hardness material. An example of such a pipe-tapered-thread machining tap is disclosed in Patent Document 1.

PRIOR ART DOCUMENT

Patent Documents

Patent Document 1: Japanese Registered Utility Model No. 3005741

DISCLOSURE OF THE INVENTION

Object to be Achieved by the Invention

However, in a pipe-tapered-thread machining tap, an amount of cut by one cutting edge in the complete thread portion is so small as about 5 μm, for example, so that the cutting edges are rubbed on an inner circumferential surface of the machined internal thread, thereby causing an inconvenience that tearing as a phenomenon of surface roughening of the inner circumferential surface of the internal thread is caused, particularly, where the work material is stainless steel or low carbon steel such as rolled steel for general structure.

In view of the issue of such tearing, it is thought that a so-called interrupting may be applied, in general, to a tap having an odd-numbered flutes such as three or five flutes, such that every other of a plurality of lands, which are located to be adjacent sequentially in a circumferential direction, with each of the flutes being interposed between corresponding two of the lands in the circumferential direction, is removed (thinned out) in a cyclic manner so as to reduce the cutting edges that are to be involved in a cutting operation. An interrupted tap defined in JISB0176 is an example of such a tap in which the interrupting is applied.

However, in the tap in which the interrupting is applied, an amount of cut made by the chamfered portion and a size of the chip room are likely to be unsuitable whereby each of the flutes could be clogged with cutting chips. Moreover, the cutting chips are bitten into a gap between a back edge (that is opposed to the cutting edge) and an inner circumferential surface of the machined internal thread when the direction of rotation of the tap is inverted, whereby a stop mark, i.e., indentation mark of the cutting edge is formed on the inner circumferential surface of the machined internal thread when the rotation of the tap is stopped, so that the sealing performance could be reduced because the stop mark forms a step on the inner circumferential surface of the machined internal thread.

The present invention was made in view of the background discussed above. It is therefore an object of the present invention to provide a spiral tap for machining a pipe tapered thread, which is capable of restraining occurrence of the tearing on the inner circumferential surface of the machined internal thread, occurrence of the cutting chip clogging and formation of the mark of the cutting edge in the machined internal thread upon stop of rotation of the tap.

Various studies made by the inventors of the present invention under the above-described situation revealed a fact that the occurrence of the tearing, the occurrence of the cutting chip clogging and the formation of the mark of the cutting edge upon stop of rotation of the tap can be unexpectedly restrained by a construction in which the chip evacuation flutes are provided by four flutes and the complete thread portion is subjected to an interrupting by which the plurality of lands located to be adjacent sequentially in the circumferential direction (with each of the flutes being interposed between corresponding two of the lands in the circumferential direction), is removed in a cyclic manner. The present invention was made based on the revealed fact.

Measures for Achieving the Object

The essence of the first invention is, in (a) a spiral tap comprising a tapered thread portion having a helically extending thread whose profile becomes from an incomplete profile to a complete profile in a direction away from a distal end of a chamfered portion toward a complete thread portion, the tapered thread portion being circumferentially divided by flutes into a plurality of lands, each of the lands having a cutting edge that is defined by one of opposite ends of the each of the lands which is located on a front side of the other of the opposite ends in a direction of rotation of the spiral tap, such that the cutting edge extends along a corresponding one of the flutes, the spiral tap being to be rotated about a rotation axis for machining a pipe tapered thread, such that the pipe tapered thread is cut by the chamfered portion and the complete thread portion of the spiral tap, that (b) the flutes are four spiral flutes by which the tapered thread portion is circumferentially divided into four lands as the plurality of lands, and the four lands have respective four cutting edges each corresponding to the cutting edge, the thread extending in a helical direction intersects with the four cutting edges, and the cutting edges includes a plurality of thread intersection portions at each of which a corresponding one of the four cutting edges intersects with the thread, (c) some of the thread intersection portions of the cutting edges are partially or entirely removed while the other of the thread intersection portions are not removed, such that at least one of each adjacent four of the thread intersection portions, which are adjacent in the helical direction and which are located in the complete thread portion, are removed, without at least another one of the each four of the thread intersection portion being removed, the thread intersection portions of the four cutting edges consist of four groups of the thread intersection portions, such that each of the four groups of the thread intersection portions consists of ones of the thread intersection portions that are portions of a corresponding one of the four cutting edges, and every two of the ones of the thread intersection portions of each of the four groups is removed, such that, in each of the four groups, at least one of the thread intersection portions that is removed and at least another one of the thread intersection portions that is not removed are alternately arranged in a direction in which a corresponding one of the four cutting edges extends.

The essence of the second invention is that each of the two cutting edges, which are partially or entirely removed, corresponds to every two of four cutting edges that are located within the one turn in the direction of the thread.

The essence of the third invention is that each of the two cutting edges, which are partially or entirely removed, corresponds to every three of four cutting edges that are located within the one turn in the direction of the thread.

The essence of the fourth invention is that each adjacent two of the removed cutting edges, which are defined in the lands located sequentially in the direction of the thread in the complete thread portion, are removed in respective parts thereof that are different from each other, wherein the adjacent two of the removed cutting edges are adjacent in the direction of the thread.

The essence of the fifth invention is that ones of the lands, which are located in the chamfered portion, are all provided with the cutting edges.

Effect of the Invention

According to the first invention, in (a) a spiral tap comprising a tapered thread portion having a helically extending thread whose profile becomes from an incomplete profile to a complete profile in a direction away from a distal end of a chamfered portion toward a complete thread portion, the tapered thread portion being circumferentially divided by flutes into a plurality of lands, each of the lands having a cutting edge that is defined by one of opposite ends of the each of the lands which is located on a front side of the other of the opposite ends in a direction of rotation of the spiral tap, such that the cutting edge extends along a corresponding one of the flutes, the spiral tap being to be rotated about a rotation axis for machining a pipe tapered thread, such that the pipe tapered thread is cut by the chamfered portion and the complete thread portion of the spiral tap, that (b) the flutes are four spiral flutes, and (c) among the plurality of cutting edges that are located sequentially in a direction of the thread in the complete thread portion, two cutting edges, which are located in respective two of the lands each corresponding to every two or every three of the lands, within one turn in the direction of the thread, are partially or entirely removed, and a cutting edge, which is located in one of the lands in which the cutting edge is not removed within the one turn, is partially or entirely removed, within another one turn adjacent to the one turn in the direction of the thread. Thus, in the complete thread portion having the four spiral flutes, among the plurality of cutting edges that are located sequentially in a direction of the thread in the complete thread portion, two cutting edges, which are located in respective two of the lands each corresponding to every two or every three of the lands, within one turn in the direction of the thread, are partially or entirely removed, and a cutting edge, which is located in one of the lands in which the cutting edge is not removed within the one turn, is partially or entirely removed, within another one turn adjacent to the one turn in the direction of the thread, so that it is possible to obtain a pipe-tapered-thread machining spiral tap that is capable of restraining occurrence of the tearing on the inner circumferential surface of the machined internal thread, occurrence of the cutting chip clogging and formation of the mark of the cutting edge upon stop of rotation of the tap.

According to the second invention, each of the two cutting edges, which are partially or entirely removed, corresponds to every two of four cutting edges that are located within the one turn in the direction of the thread. Thus, it is possible to obtain a pipe-tapered-thread machining spiral tap that is capable of restraining occurrence of the tearing on the inner circumferential surface of the machined internal thread, occurrence of the cutting chip clogging and formation of the mark of the cutting edge upon stop of rotation of the tap.

According to the third invention, each of the two cutting edges, which are partially or entirely removed, corresponds to every three of four cutting edges that are located within the one turn in the direction of the thread. Thus, it is possible to obtain a pipe-tapered-thread machining spiral tap that is capable of restraining occurrence of the tearing on the inner circumferential surface of the machined internal thread, occurrence of the cutting chip clogging and formation of the mark of the cutting edge upon stop of rotation of the tap.

According to the fourth invention, each adjacent two of the removed cutting edges, which are defined in the lands located sequentially in the direction of the thread in the complete thread portion, are removed in respective parts thereof that are different from each other, wherein the adjacent two of the removed cutting edges are adjacent in the direction of the thread. Thus, it is possible to obtain a pipe-tapered-thread machining spiral tap that is capable of restraining occurrence of the tearing on the inner circumferential surface of the machined internal thread, occurrence of the cutting chip clogging and formation of the mark of the cutting edge upon stop of rotation of the tap.

According to the fifth invention, ones of the lands, which are located in the chamfered portion, are all provided with the cutting edges. Thus, it is possible to efficiently cut a pipe tapered thread.

Preferably, each of the spiral flutes has a helix angle that is, for example, 35°-45°, more preferably, 40°, thereby making it possible to further restrain the cutting chip clogging.

Preferably, each of the lands has a back edge that is defined by the other of the opposite ends of each of the lands which is located on a front side of the one of the opposite ends in a direction opposite to the direction of rotation of the tap, such that the back edge extends along a corresponding one of the flutes, and a rake angle of the back edge is smaller than a rake angle of the cutting edge. Thus, formation of mark of the cutting edge upon stop of rotation of the tap is further restrained.

Preferably, a relief angle is defined in the chamfered portion from the cutting edge to an intermediate position in a width of each of the lands, and the relief angle is zero from the intermediate position to the back edge. Thus, the back edge is retreated relative to the cutting edge by a small amount whereby formation of mark of the cutting edge upon stop of rotation of the tap is further restrained.

Preferably, at least the chamfered portion and the complete thread portion are subjected to a surface treatment with a titanium carbonitride TiCN film, so that the durability of the pipe-tapered-thread machining spiral tap is increased.

Preferably, cemented carbide or high-speed tool steel is preferably used as a substrate that is to be covered with the titanium carbonitride TiCN film as a hard coating. However, any one of the other kinds of tool materials may be used as the substrate.

BRIEF DESCRIPTION OF DRAWINGS

FIG. 3 is a view explaining an interrupting applied to the pipe-tapered-thread machining spiral tap of FIG. 1, and indicating, by elliptical broken lines, positions of removed ones of a plurality of portions of cutting edges, which ones correspond to every other of the plurality of portions of the cutting edges arranged sequentially in a thread extending direction and located in a complete thread portion.

FIG. 4 is a table showing a pattern of removal of the cutting edges by the interrupting of FIG. 3.

FIG. 7 is a table explaining a plurality of kinds of taps, i.e., embodiment example 1 and comparative examples 1-3, which were prepared by the present inventors and their collaborators so as to be used in cutting tests.

FIG. 8 is a set of tables explaining results of the cutting tests conducted by using the plurality of kinds of taps of FIG. 7.

FIG. 10 is a table corresponding to the table of FIG. 4 and showing a pattern of removal of the cutting edges by the interrupting of FIG. 9.

FIG. 11 is a set of front views each showing the cutting edge 24, as seen from inside a spiral flute, in a tooth trace direction, i.e., in the thread extending direction, which was subjected to an interrupting according to another embodiment of the invention, wherein solid line represents a shape of the cutting edge 24 in which a part of a ridge, specifically, a chamfered-portion side part of the ridge, as one of the above-described removed ones that correspond to every other of the plurality of portions of the cutting edges 24 arranged sequentially in the thread extending direction, was removed. The view (b) shows a shape of the cutting edge 24 defined by another spiral flute that is adjacent to the spiral flute defining the cutting edge 24 shown in the view (a), wherein a shank-side part as a part of the ridge was removed. It is noted that two-dotted line shows a removed part of the cutting edge.

MODES FOR CARRYING OUT THE INVENTION

A pipe-tapered-thread machining spiral tap as an embodiment of the present invention will be described in detail with reference to the drawings.

Embodiment 1

Figure 1:
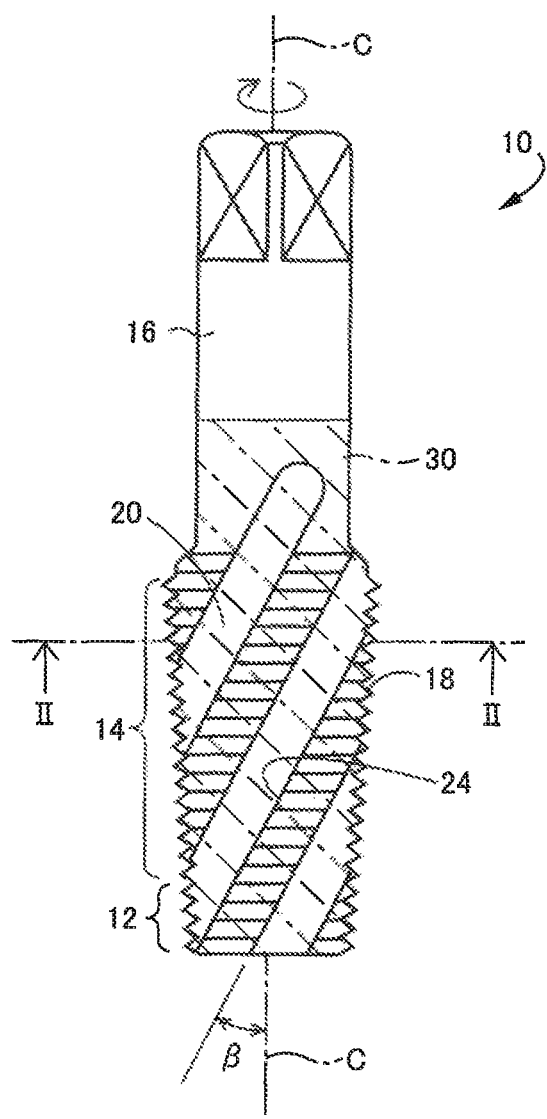
FIG. 1 is a front view showing a pipe-tapered-thread machining spiral tap according to an embodiment of the invention.
Figure 2:
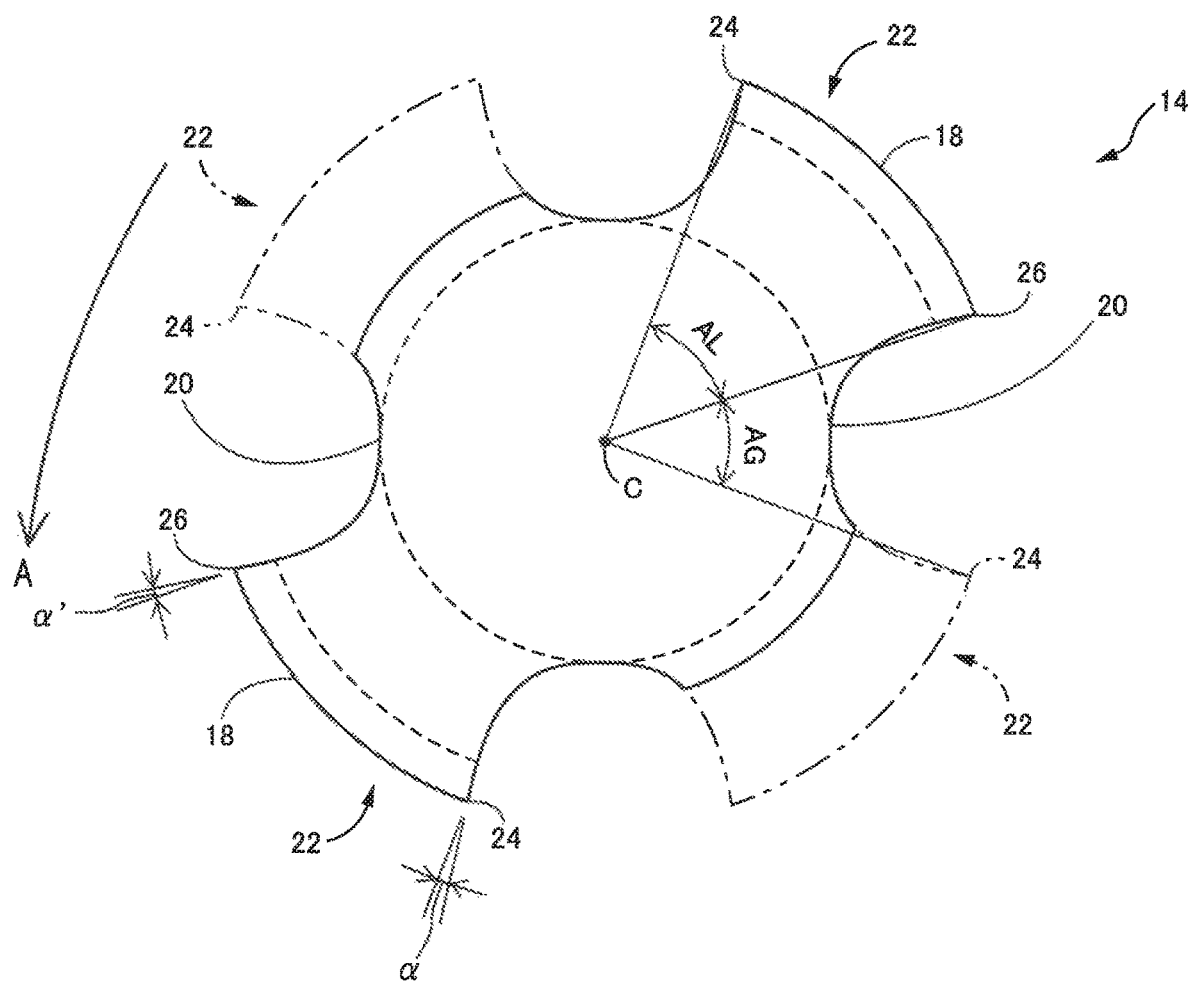
FIG. 2 is a cross sectional view taken along line II-II and explaining construction of the pipe-tapered-thread machining spiral tap of FIG. 1.

FIG. 1 is a front view showing a pipe-tapered-thread machining spiral tap 10 according to an embodiment of the invention. FIG. 2 is a view showing, in enlargement, a cross section taken along line II-II of FIG. 1. The pipe-tapered-thread machining spiral tap 10 is made of a material such as high-speed tool steel or cemented carbide, for example, by grinding.

As shown in FIGS. 1 and 2, the pipe-tapered-thread machining spiral tap 10 has a chamfered portion 12, a complete thread portion 14 and a shank portion 16 that are arranged in this order as view in a direction away from its distal end, and is to be rotated about its rotation axis rotation axis C. A tapered thread portion, which is constituted by the chamfered portion 12 and the complete thread portion 14, has a tapered thread 18 that extends in a helical direction of the generally-cylindrical-shaped tap 10. A profile of the thread 18 becomes from an incomplete profile to a complete profile in a direction away from a distal end of the chamfered portion 12 toward the complete thread portion 14. The tapered thread portion 18 is circumferentially divided by a plurality of spiral flutes 20 into a plurality of lands 22. Although each of the spiral flutes 20 may be either a right-hand spiral flute or a left-hand spiral flute, it is the right-hand spiral flute in the present embodiment.

Thus, a cutting edge 24 is defined by one of opposite ends of the land 22, which is located on a front side of the other of the opposite ends in a direction A of rotation of the tap 10, such that the cutting edge 24 extends along the spiral flute 20. Meanwhile, a back edge 26 is defined by the other of the opposite ends of the land 22, which is located on a front side of the above-described one of the opposite ends of the land 22 in a direction opposite to the rotation direction A, such that the back edge 26 extends along the right-hand spiral flute 20. The spiral flute 20 has a cross section whose shape is adapted such that a rake angle α of the cutting edge 24 is about four to ten times as large as a rake angle α' of the back edge 26.

The right-hand spiral flutes 20 function as flutes for storing or evacuating cutting chips, and consist of 3-5 flutes that are arranged with a constant interval between each adjacent two of the flutes 20 in a circumferential direction. Each of the spiral flutes 20 has substantially the same degree of bottom slope as the pipe tapered thread 18 of the thread portion. In the present embodiment, the spiral flutes 20 consist of four flutes, so that the thread portion in which the tapered thread 18 is provided is circumferentially divided by the four right-hand spiral flutes 20 whereby the four lands 22 are formed. A helix angle β of each spiral flute 20 is not smaller than 30° and smaller than 50°, preferably 35°-45°, and more preferably a value close to 40°.

FIG. 2 shows a cross section of the complete thread portion 14, which is perpendicular to the rotation axis C. As shown in FIG. 2 in detail, the cross sectional shape of each spiral flute 20 is adapted for satisfying a relationship AL>AG where "AG" represents a central angle AG which is subtended by each spiral flute 20 and which is defined at a center corresponding to the rotation axis C while "AL" which is subtended by each land 22 and which is defined at the center corresponding to the rotation axis C. More in detail, a flute width ratio, which is defined by AG/(AG+AL), is not smaller than 0.3 and is not larger than 0.5.

The pipe-tapered-thread machining spiral tap 10 of the present embodiment is subjected to an interrupting by which the cutting edges 24 are thinned out in accordance with a predetermined cyclic pattern, as shown in FIGS. 2, 3 and 4. That is, as shown in FIG. 2, among the plurality of lands 22 that are located sequentially in a thread extending direction of the thread 18 in the complete thread portion 14, every two of the lands 22 is substantially entirely removed, for example, in the cross sectional view taken along line II-II of FIG. 1. That is, every other of the lands 22 arranged sequentially in the thread extending direction of the thread 18 and located in the complete thread portion 14, is removed at least in the cross sectional view taken along line II-II of FIG. 1. FIG. 4 is table showing a pattern of removal of the cutting edges 24 by the interrupting according to the present embodiment. Thus, among a plurality of portions of the cutting edges 24 arranged sequentially in the thread extending direction of the thread 18 and located in the complete thread portion 14, predetermined ones of the plurality of portions of the cutting edges 24 are removed in their substantial entirety, wherein the predetermined ones are determined in accordance with the removal pattern shown in FIG. 4. The plurality of portions of the cutting edges 24 are portions at each of which a corresponding one of the cutting edges 24 intersects with the thread 18 extending in the helical direction. Hereinafter, the plurality of portions of the cutting edges 24 will be referred to as "thread intersection portions 19". The thread intersection portions 19 consist of four groups, each of which consists of ones of the thread intersection portions (19) that are portions of a corresponding one of the four cutting edges (24). It is noted that, at least in the cross sectional view taken along line II-II of FIG. 1, the cutting edge 24 is provided in every other of the four lands 22 in the circumferential direction, as shown in FIG. 2. In FIG. 2, two-dotted lines represent the removed lands and also the lands adjacent to the removed lands in a direction parallel to the rotation axis C.

In FIG. 3, positions of removed ones of the plurality of thread intersection portions 19 of the cutting edges 24, which ones are determined in accordance with the removal pattern shown in FIG. 4, are indicated by elliptical broken lines. It is noted that FIG. 4 is the table showing the pattern of removal of the cutting edges 24 in the pipe-tapered-thread machining spiral tap having the chamfered portion 12 whose length corresponds to two thread ridges and the complete thread portion 14 whose length corresponds to eighth thread ridges, and that one cycle of the removal pattern corresponds to two turns of a plurality of turns which cooperate with each other to constitute a helix of the helically extending thread 18 and which are successive to each other in the helical direction. As is apparent from FIG. 4, some of the thread intersection portions 19 of the cutting edges 24 are removed while the other of the thread intersection portions 19 are not removed, such that at least one of each adjacent four of the thread intersection portions 19, which are adjacent in the helical direction and which are located in the complete thread portion 14, without at least another one of the each four of the thread intersection portion 19 being removed, and such that every two of ones of the thread intersection portions 19 of each of the above-described four groups is removed, so that, in each of the four groups, at least one of the thread intersection portions 19 that is removed and at least another one of the thread intersection portions 19 that is not removed are alternately arranged in a direction in which a corresponding one of the four cutting edges 24 extends. The above-described some of the thread intersection portions 19, which are removed, include at least one pair of the thread intersection portions 19 consisting of two thread intersection portions 19 which are adjacent to each other in the helical direction and which are located in the complete thread portion 14, and the above-described other of the thread intersection portions 19, which are not removed, include at least one pair of the thread intersection portions 19 consisting of two thread intersection portions 19 which are adjacent to each other in the helical direction and which are located in the complete thread portion 14. In the present embodiment, among adjacent four of the thread intersection portions 19, which are adjacent in the helical direction and which are located in a contiguous portion of the complete thread portion 14 contiguous to the chamfered portion 12, every two of the adjacent four of the thread intersection portions 19 are removed. It is noted that ones of the thread intersection portions 19, which are located in the chamfered portion 12, remain without any of them being removed, as is apparent from FIG. 4.

Figure 5:
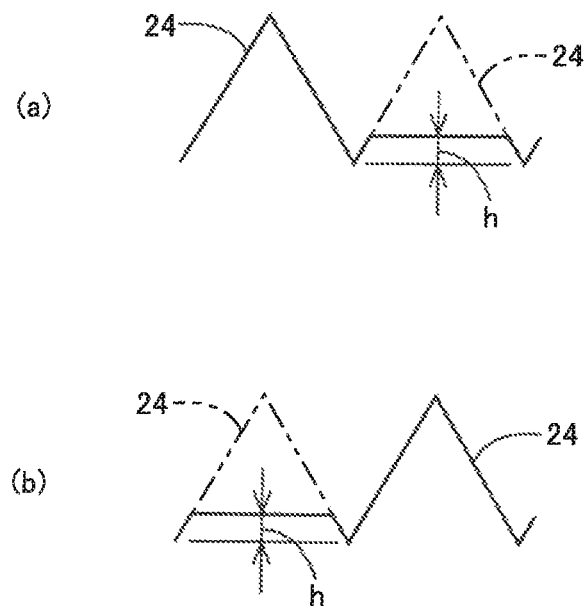
FIG. 5 is a set of front views each showing the cutting edge 24, as seen from inside a spiral flute, in a tooth trace direction, i.e., in the thread extending direction, which was subjected to the interrupting shown in FIGS. 3 and 4, wherein solid line represents a shape of the cutting edge 24 in which substantial entirety of a ridge as one of the above-described removed ones that correspond to every other of the plurality of portions of the cutting edges 24 arranged sequentially in the thread extending direction, was removed. The view (b) shows the cutting edge 24 defined by another spiral flute that is adjacent to the spiral flute defining the cutting edge 24 shown in the view (a). It is noted that two-dotted line shows a removed part of the cutting edge.

FIG. 5 is a set of front views each showing the cutting edge 24, as seen from inside the spiral flute 20, in a tooth trace direction, i.e., in the thread extending direction of the cutting edge 24, which was subjected to the above-described interrupting, wherein solid line represents a shape of the cutting edge 24 in which substantial entirety of a ridge as one of the above-described predetermined ones of the thread intersection portions 19 was removed. As shown in FIG. 5, in the land 22 in which the removed thread intersection portion 19 is located, a part having a height h of less than 0.1 mm as measured from an outer circumferential surface of a core is left. The view (b) of FIG. 5 shows the cutting edge 24 defined by another spiral flute 20 that is adjacent to the spiral flute 20 defining the cutting edge 24 shown in the view (a) of FIG. 5. It is noted that two-dotted line shows a removed part of the cutting edge 24.

Figure 6:
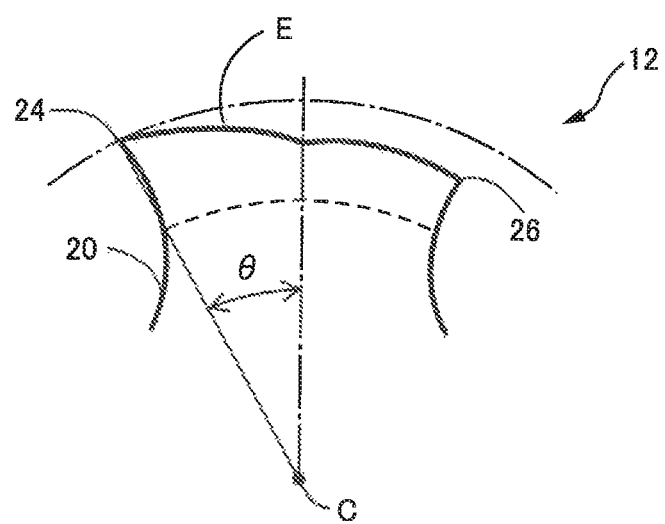
FIG. 6 is a cross sectional view showing a major portion of a chamfered portion and explaining construction of the pipe-tapered-thread machining spiral tap of FIG. 1.

FIG. 6 shows, in enlargement, a cross section of the chamfered portion 12. As shown in FIG. 6, a relieved surface E is defined such that a radial distance from the rotation axis C to the relieved surface E is reduced in a direction opposite to the rotation direction in a region from the cutting edge 24 to an intermediate position in a width of the land 22 (blade thickness), namely, in a range from the cutting edge 24 over an angle θ, for example, 20°-23°, and such that the radial distance is constant in the direction opposite to the rotation direction, with a relief angle being zero, in a region from the intermediate position to a heel (back edge 26) of the land 22.

The pipe-tapered-thread machining spiral tap 10 is subjected, at least the chamfered portion 12 and the complete thread portion 14, to a surface treatment, whereby a titanium carbonitride TiCN film 30, for example, is formed thereon.

The present inventor and his collaborators experimentally prepared various types of pipe-tapered-thread machining spiral taps, i.e., embodiment example 1 and comparative examples 1, 2 and 3, which are the same as one another in terms of the material (high-speed tool steel), the surface treatment (titanium carbonitride TiCN), the type (Rc1/2) of tapered thread to be machined (namely, the number of thread ridges, pitch and thread height of the machined thread) and the rake angle α (12°) of the cutting edge 24, and which are different from one another in terms of the number of the spiral flutes 20, the central angle of the land 22 and presence/absence of the interrupting. Then, they conducted cutting tests of machining a pipe tapered internal thread of a stainless-steel pipe joint, at a number of revolutions of 60 rpm (equivalent to a cutting speed of 4 m/min). FIG. 7 shows constructions of the embodiment example 1 and the comparative examples 1, 2 and 3. FIG. 8 shows results of the cutting tests using the embodiment example 1 and the comparative examples 1, 2 and 3.

The embodiment example 1 and the comparative examples 1, 2, and 3 are the same as one another in that a length of the chamfering portion corresponds to 2.5 thread ridges, a helix angle β of the spiral flute is 40°, a size of the machined thread is Rc1/2, the thread height is 1.16 mm and the flute width ratio AG/(AG+AL) is 0.4. However, they are different in that the number of the spiral flutes is four and the interrupting is applied as shown in FIG. 2 in the embodiment example 1, the number of the spiral flutes is three in the comparative example 1, the interrupting is not applied in the comparative example 2 and the number of the spiral flutes is five in the comparative example 3.

As shown in the test results of FIG. 8, the embodiment example 1 provided a pipe tapered internal thread that satisfies a predetermined evaluation criteria. That is, on the inner circumferential surface of the internal thread machined by the embodiment example 1, neither tearing nor mark of the cutting edge, which could be formed upon stop of rotation of the tap, was founded. Further, during the machining by the embodiment example 1, cutting chip clogging was not occurred. However, on the inner circumferential surface of the internal thread machined by the comparative example 1, the mark of the cutting edge was formed upon stop of rotation of the tap. Further, during the machining by the comparative example 2, the cutting chip had a bellows-like shape that impeded evacuation of the chip and caused the tearing. Further, during the machining by the comparative example 3, the cutting chip clogging was occurred. The chip clogging could induce breakage of the tool during the machining.

As described above, according to the pipe-tapered-thread machining spiral tap 10 of the present embodiment, there are provided four spiral flutes 20, among the plurality of thread intersection portions 19 of the cutting edges 24 that are located sequentially in the thread extending direction of the thread 18 in the complete thread portion 14, the predetermined ones of the thread intersection portions 19, which are determined in accordance with the removal pattern shown in FIG. 4, are removed. Specifically, at least one of each adjacent four of the thread intersection portions 19, which are adjacent in the helical direction and which are located in the complete thread portion 14, without at least another one of the each four of the thread intersection portion 19 being removed, such that at least among adjacent four of the thread intersection portions 19, which are adjacent in the helical direction and which are located in a contiguous portion of the complete thread portion 14 contiguous to the chamfered portion 12, every two of the adjacent four of the thread intersection portions 19 are removed, and such that every two of ones of the thread intersection portions 19 of each of the above-described four groups is removed, so that, in each of the four groups, at least one of the thread intersection portions 19 that is removed and at least another one of the thread intersection portions 19 that is not removed are alternately arranged in a direction in which a corresponding one of the four cutting edges 24 extends. Owing to this arrangement, it is possible to obtain the pipe-tapered-thread machining spiral tap 10 that is capable of restraining occurrence of the tearing on the inner circumferential surface of the machined internal thread, occurrence of the cutting chip clogging and formation of the mark of the cutting edge upon stop of rotation of the tap.

Further, according to the pipe-tapered-thread machining spiral tap 10 of the present embodiment, among the plurality of thread intersection portions 19 that are located sequentially in the thread extending direction of the thread 18 in the complete thread portion 14, the predetermined ones of the thread intersection portions 19, which are determined in accordance with the removal pattern shown in FIG. 4, are removed, wherein the one cycle of the removal pattern corresponds to two turns of the plurality of turns which cooperate with each other to constitute the helix of the helically extending thread 18 and which are successive to each other in the helical direction. Thus, it is possible to obtain the pipe-tapered-thread machining spiral tap 10 that is capable of restraining occurrence of the tearing on the inner circumferential surface of the machined internal thread, occurrence of the cutting chip clogging and formation of the mark of the cutting edge upon stop of rotation of the tap.

Further, according to the pipe-tapered-thread machining spiral tap 10 of the present embodiment, at least among adjacent four of the thread intersection portions 19, which are adjacent in the helical direction and which are located in the contiguous portion of the complete thread portion 14 contiguous to the chamfered portion 12, every two of the adjacent four of the thread intersection portions 19 are removed. Thus, it is possible to obtain the pipe-tapered-thread machining spiral tap 10 that is capable of restraining occurrence of the tearing on the inner circumferential surface of the machined internal thread, occurrence of the cutting chip clogging and formation of the mark of the cutting edge upon stop of rotation of the tap.

Further, according to the pipe-tapered-thread machining spiral tap 10 of the present embodiment, in the chamfered portion 12 having the four spiral flutes 20, the plurality of lands, each adjacent two of which are located on respective opposite sides of a corresponding one of the flutes 20, are not removed at all. Thus, it is possible to efficiently cut a pipe tapered thread.

Further, according to the pipe-tapered-thread machining spiral tap 10 of the present embodiment, each of the spiral flutes 20 has a helix angle that is, for example, 35°-45°, more preferably, 40°, thereby making it possible to further restrain the cutting chip clogging.

Further, according to the pipe-tapered-thread machining spiral tap 10 of the present embodiment, each of the lands 22 has the back edge 26 that is defined by the other of the opposite ends of each of the lands 22 which is located on a front side of the one of the opposite ends in a direction opposite to the direction of rotation of the tap 10, such that the back edge 26 extends along a corresponding one of the flutes, and the rake angle of the back edge 26 is smaller than the rake angle of the cutting edge 24. Thus, formation of mark of the cutting edge upon stop of rotation of the tap is further restrained.

Further, according to the pipe-tapered-thread machining spiral tap 10 of the present embodiment, the relief angle is defined in the chamfered portion 12 from the cutting edge 24 to an intermediate position in a width of each of the lands 22, and the relief angle is zero from the intermediate position to the back edge 26. Thus, the back edge 26 is retreated relative to the cutting edge 24 by a small amount whereby formation of mark of the cutting edge upon stop of rotation of the tap is further restrained.

Further, according to the pipe-tapered-thread machining spiral tap 10 of the present embodiment, at least the chamfered portion 12 and the complete thread portion 14 are subjected to the surface treatment with the titanium carbonitride TiCN film, so that the durability of the pipe-tapered-thread machining spiral tap 10 is increased.

Embodiment 2

Next, other embodiments of the present invention will be described hereinafter. In the following description, the same reference sings as used in the above-described embodiment will be used to identify elements common to the embodiments, and the common elements will not be described.

Figure 9:
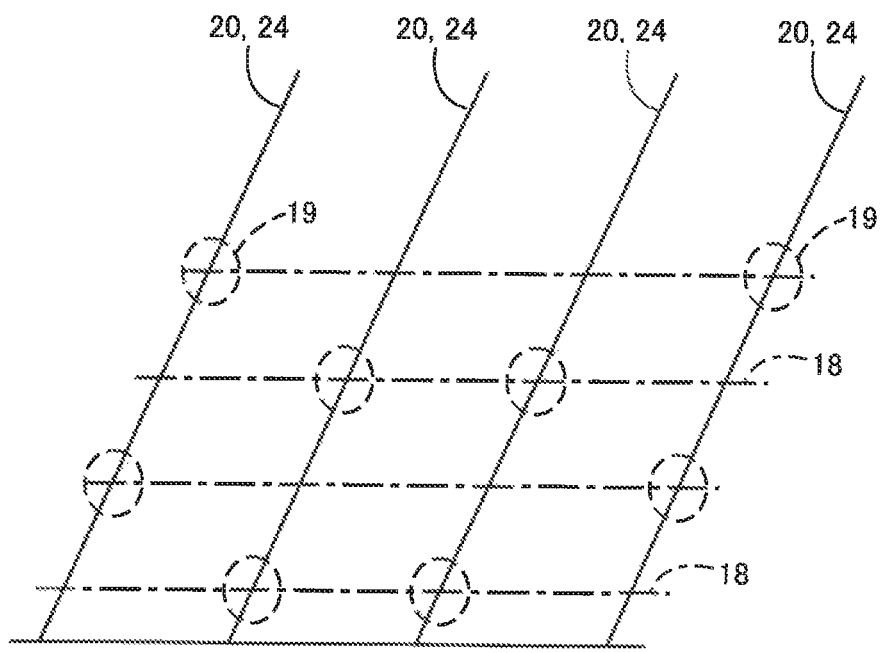
FIG. 9 is a view, which corresponds to the view of FIG. 3, explaining an interrupting applied to the pipe-tapered-thread machining spiral tap in another embodiment of the invention, and indicating, by elliptical broken lines, positions of removed ones of a plurality of portions of cutting edges, which ones correspond to two of each adjacent four of the lands that are located sequentially in the direction of the thread in a complete thread portion, wherein other two of the each adjacent four of the lands are located between the two of the each adjacent four of the lands.

FIG. 9 is a view explaining an interrupting applied to the pipe-tapered-thread machining spiral tap 10 in another embodiment of the invention and indicating, by elliptical broken lines, positions of removed ones of the plurality of thread intersection portions 19 of the cutting edges 24, which ones are determined in accordance with a removal pattern shown in FIG. 10. Like the above-described removal pattern of FIG. 4, one cycle of the removal pattern of FIG. 10 corresponds to two turns of the plurality of turns which cooperate with each other to constitute the helix of the helically extending thread 18 and which are successive to each other in the helical direction. As is apparent from FIG. 10, some of the thread intersection portions 19 of the cutting edges 24 are removed while the other of the thread intersection portions 19 are not removed, such that at least one of each adjacent four of the thread intersection portions 19, which are adjacent in the helical direction and which are located in the complete thread portion 14, without at least another one of the each four of the thread intersection portion 19 being removed, and such that every two of ones of the thread intersection portions 19 of each of the above-described four groups is removed, so that, in each of the four groups, at least one of the thread intersection portions 19 that is removed and at least another one of the thread intersection portions 19 that is not removed are alternately arranged in a direction in which a corresponding one of the four cutting edges 24 extends. The above-described some of the thread intersection portions 19, which are removed, include at least one pair of the thread intersection portions 19 consisting of two thread intersection portions 19 which are adjacent to each other in the helical direction and which are located in the complete thread portion 14, and the above-described other of the thread intersection portions 19, which are not removed, include at least one pair of the thread intersection portions 19 consisting of two thread intersection portions 19 which are adjacent to each other in the helical direction and which are located in the complete thread portion 14. It is noted that ones of the thread intersection portions 19, which are located in the chamfered portion 12, remain without any of them being removed, as is apparent from FIG. 10.

According to the pipe-tapered-thread machining spiral tap 10 of the present embodiment, at least among adjacent four of the thread intersection portions 19, which are adjacent in the helical direction and which are located in a contiguous portion of the complete thread portion 14 contiguous to the chamfered portion 12, two of the adjacent four of the thread intersection portions 19 are removed while other two of the adjacent four, which are located between the two of the adjacent four in the helical direction, are not removed. Thus, it is possible to obtain the pipe-tapered-thread machining spiral tap 10 that is capable of restraining occurrence of the tearing on the inner circumferential surface of the machined internal thread, occurrence of the cutting chip clogging and formation of the mark of the cutting edge upon stop of rotation of the tap.

Embodiment 3

FIG. 11 is a set of front views each showing the cutting edge 24, as seen from inside the spiral flute 20, in a tooth trace direction, i.e., in the thread extending direction of the thread 18, in the pipe-tapered-thread machining spiral tap 10 according to the present embodiment. In FIG. 11, solid line represents a shape of the cutting edge 24 in which a part of a ridge, specifically, a chamfered-portion side part of the ridge, as one of the removed ones that correspond to every other of the plurality of portions of the cutting edges 24 arranged sequentially in the thread extending direction of the thread 18, was removed by the above-described interrupting. The view (b) shows a shape of the cutting edge 24 defined by another spiral flute that is adjacent to the spiral flute defining the cutting edge 24 shown in the view (a), wherein a shank-side part as a part of the ridge was removed. It is noted that two-dotted line shows a removed part of the cutting edge.

According to the pipe-tapered-thread machining spiral tap 10 of the present embodiment, each of the removed thread intersection portions 19 is partially removed, and each two of the removed thread intersection portions 19, which are adjacent to each other in the helical direction, are removed in respective parts thereof that are different from each other. Thus, it is possible to obtain the pipe-tapered-thread machining spiral tap 10 that is capable of restraining occurrence of the tearing on the inner circumferential surface of the machined internal thread, occurrence of the cutting chip clogging and formation of the mark of the cutting edge upon stop of rotation of the tap.

While the embodiments of the present invention have been described above, it is to be understood that the present invention may be embodied otherwise.

For example, the interrupting, by which some of the cutting edges 24 are removed, may be based on a pattern that is other than those described in the above-described embodiments. Further, in FIG. 5, the land 22 may be removed down to a root of the thread 18.

Further, in the pipe-tapered-thread machining spiral tap 10, the helix angle of each of the spiral flutes 20 does not necessarily have to be 40°. Further, the cross sectional shape of each spiral flute 20 does not necessarily have to be adapted to satisfy the relationship AL>AG.

Further, the cross section of each spiral flute 20 does not necessarily have to be adapted such that the rake angle α of the cutting edge 24 is about four to ten times as large as the rake angle α of the back edge 26.

While the embodiments of the present invention have been described by reference to the accompanying drawings, it is to be understood that the invention is applicable to other forms in a range without departing from the spirit of the invention.

DESCRIPTION OF REFERENCE SIGNS

10: pipe-tapered-thread machining spiral tap 12: chamfered portion 14: complete thread portion 16: shank portion 18: thread 20: spiral flute 22: land 24: cutting edge

The invention claimed is:

1. A spiral tap comprising a tapered thread portion having a helically extending thread whose profile becomes from an incomplete profile to a complete profile in a direction away from a distal end of a chamfered portion toward a complete thread portion, said tapered thread portion being circumferentially divided by flutes into a plurality of lands, each of said lands having a cutting edge that is defined by one of opposite ends of said each of said lands which is located on a front side of the other of said opposite ends in a direction of rotation of said spiral tap, such that said cutting edge extends along a corresponding one of said flutes, wherein
said spiral tap is to be rotated about a rotation axis for machining a pipe tapered thread, such that the pipe tapered thread is cut by said chamfered portion and said complete thread portion of said spiral tap,
said flutes are four spiral flutes by which said tapered thread portion is circumferentially divided into four lands as said plurality of lands, and said four lands have respective four cutting edges each corresponding to said cutting edge,
said thread extending in a helical direction intersects with said four cutting edges, and said cutting edges includes a plurality of thread intersection portions at each of which a corresponding one of said four cutting edges intersects with said thread, each thread intersection portion of said plurality of thread intersection portions comprising a single intersection of said thread with said corresponding one of said four cutting edges,
some of said thread intersection portions of said cutting edges are partially or entirely removed while the other of said thread intersection portions are not removed, such that at least one of each adjacent four of said thread intersection portions, which are adjacent in said helical direction and which are located in said complete thread portion, are removed, without at least another one of said each four of said thread intersection portion being removed,
said thread intersection portions of said four cutting edges consist of four groups of said thread intersection portions, such that each of said four groups of said thread intersection portions consists of ones of said thread intersection portions that are portions of a corresponding one of said four cutting edges, and
every two of said ones of said thread intersection portions of each of said four groups is removed, such that, in each of said four groups, at least one of said thread intersection portions that is removed and at least another one of said thread intersection portions that is not removed are alternately arranged in a direction in which a corresponding one of said four cutting edges extends.

2. The spiral tap according to claim 1, wherein
among adjacent four of said thread intersection portions, which are adjacent in said helical direction and which are located in a contiguous portion of said complete thread portion contiguous to said chamfered portion, every two of said adjacent four of said thread intersection portions are removed.

3. The spiral tap according to claim 1, wherein
among adjacent four of said thread intersection portions, which are adjacent in said helical direction and which are located in a contiguous portion of said complete thread portion contiguous to said chamfered portion, adjacent two of said adjacent four of said thread intersection portions, which are adjacent to each other, are removed while other adjacent two of said adjacent four, which are located between said adjacent two of said adjacent four in said helical direction, are not removed.

4. The spiral tap according to claim 1, wherein
each of said some of said thread intersection portions is partially removed, and
each two of said some of said thread intersection portions, which are adjacent to each other in said helical direction, are removed in respective parts thereof that are different from each other.

5. The spiral tap according to claim 1, wherein
ones of said thread intersection portions, which are located in said chamfered portion, are not removed.

6. The spiral tap according to claim 1, wherein
said some of said thread intersection portions of said cutting edges, which are removed, are thread intersection portions that are determined to be removed, in accordance with a removal pattern that is a predetermined cyclic pattern, and
one cycle of said removal pattern corresponds to two turns included in a plurality of turns successive to each other in said helical direction and cooperating with each other to constitute a helix along which said thread extends.

7. The spiral tap according to claim 1, wherein
said some of said thread intersection portions of said cutting edges, which are removed, include at least one pair of said thread intersection portions consisting of two thread intersection portions which are adjacent to each other in said helical direction and which are located in said complete thread portion, and
said other of said thread intersection portions of said cutting edges, which are not removed, include at least one pair of said thread intersection portions consisting of two thread intersection portions which are adjacent to each other in said helical direction and which are located in said complete thread portion.

* * * * *